Figure 1:
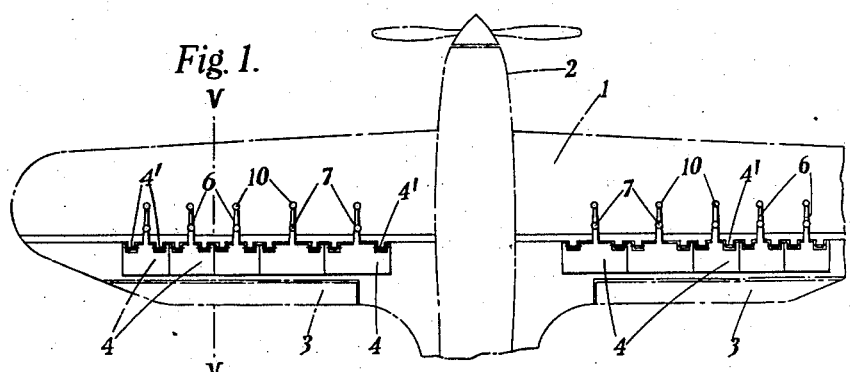
Figure 2:
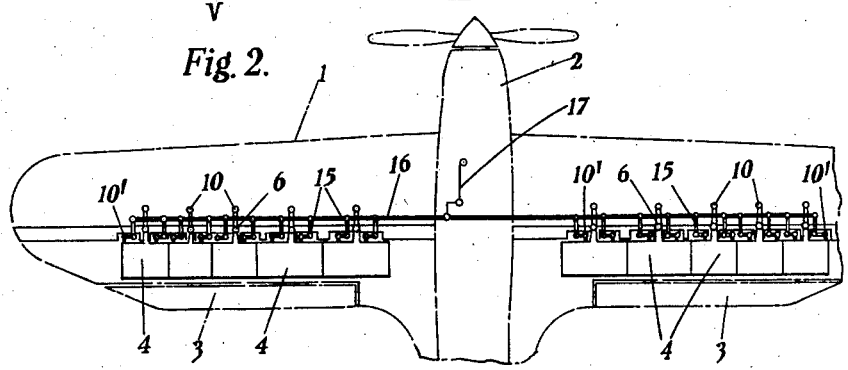
Figure 3:
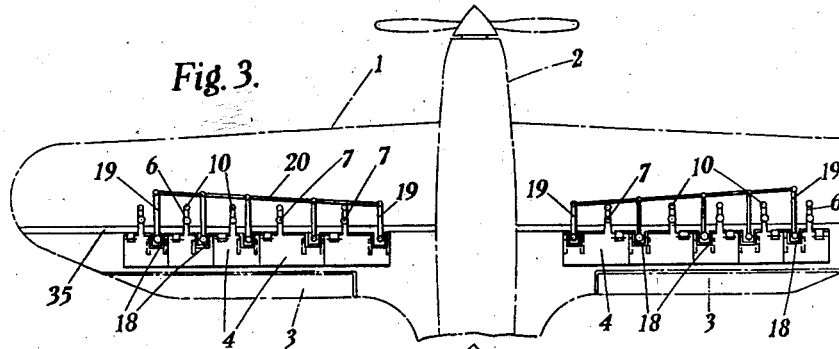
Figure 4:
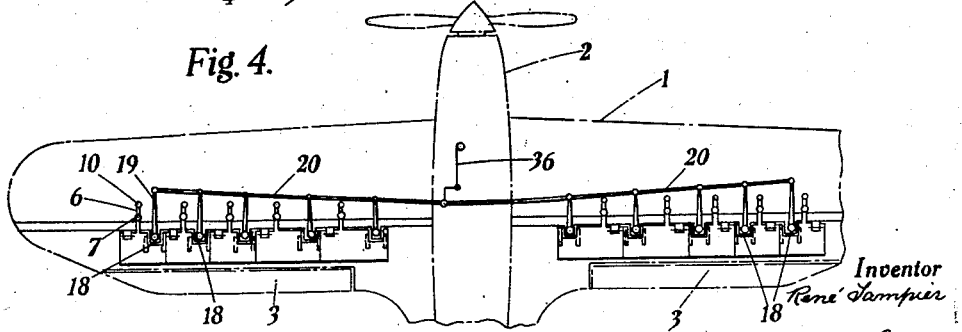
Figure 5:
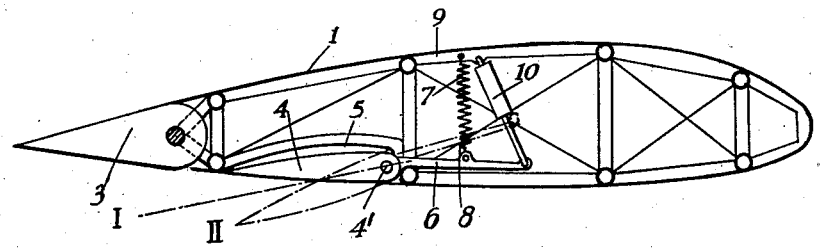
Figure 10:
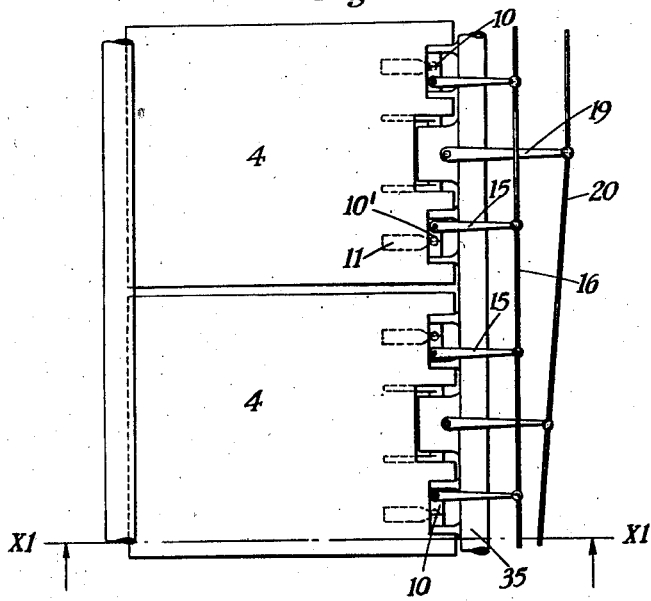
Figure 11:
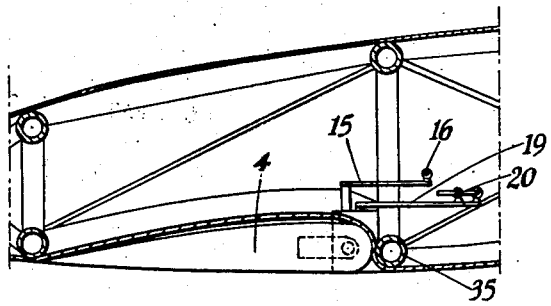
Figure 1:
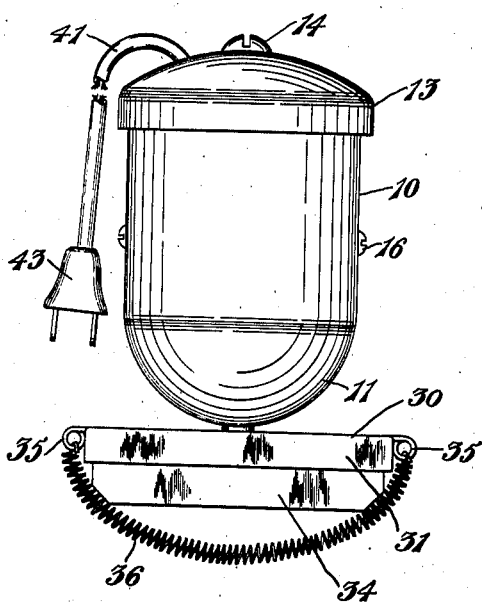
Figure 2:
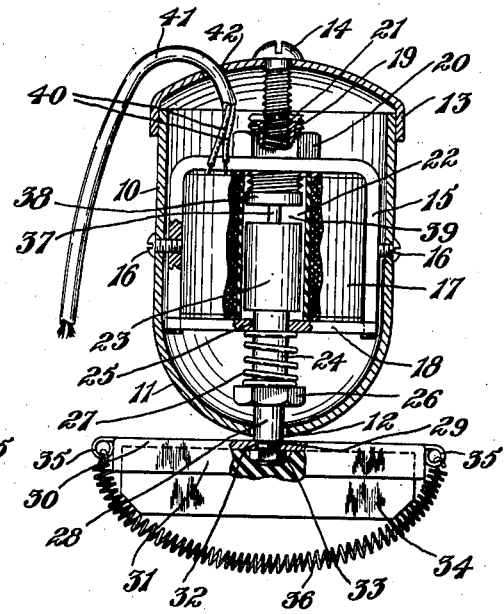
Figure 3:
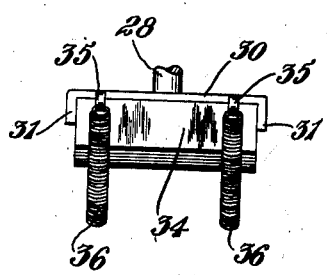
Figure 4:
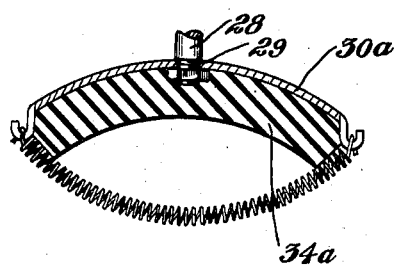

April 11, 1944.   R. TAMPIER   2,346,464
STABILIZING DEVICE FOR AIRCRAFT
Filed June 3, 1939    3 Sheets-Sheet 1

Inventor
René Tampier
by
Attorney

April 11, 1944.   R. TAMPIER   2,346,464
STABILIZING DEVICE FOR AIRCRAFT
Filed June 3, 1939   3 Sheets-Sheet 2

Inventor
René Tampier
by
A. Knight Leroad
Attorney

April 11, 1944.  R. TAMPIER  2,346,464
STABILIZING DEVICE FOR AIRCRAFT
Filed June 3, 1939  3 Sheets-Sheet 3
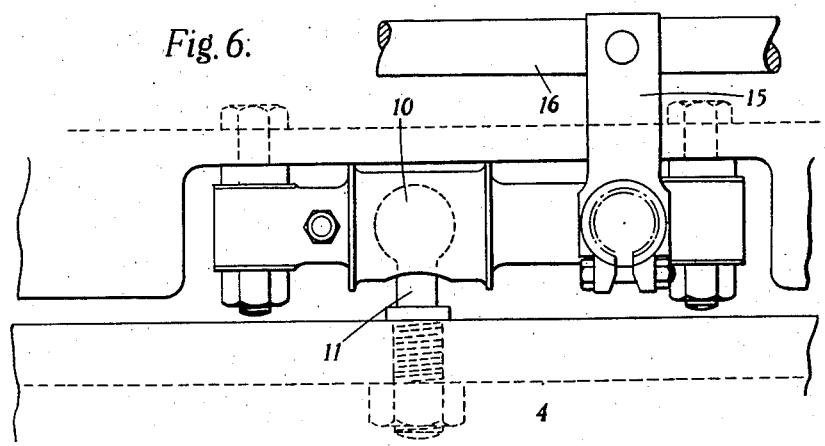
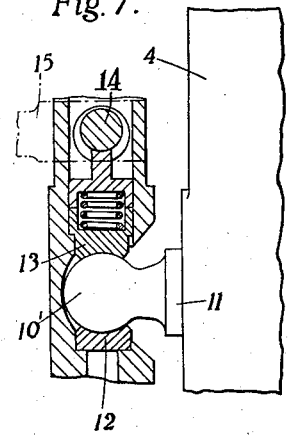
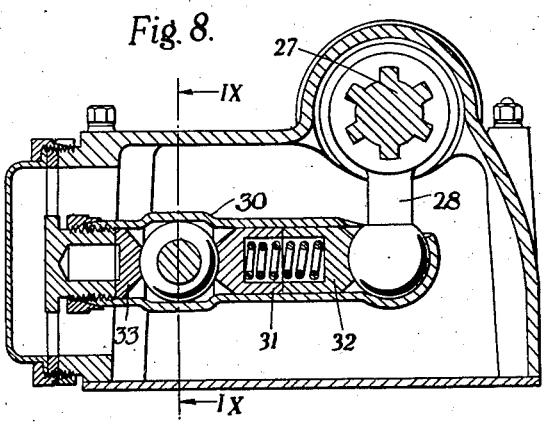
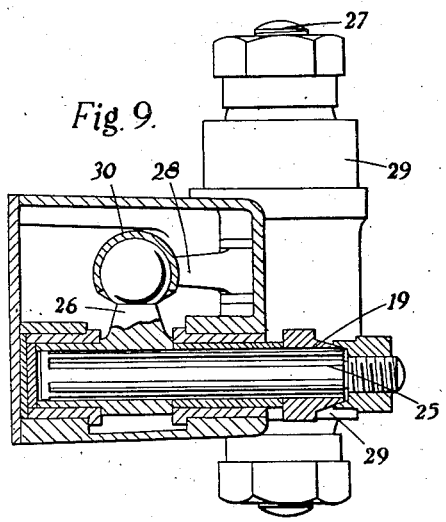
Inventor
René Tampier
by
A. Knight Cerand
Attorney April 11, 1944. A. C. WILCOX 2,346,465
VIBRATOR
Filed April 10, 1942 2 Sheets-Sheet 1

Inventor
Albert C. Wilcox
By Frease and Bishop
Attorneys